(12) United States Patent
Prejean et al.

(10) Patent No.: US 8,598,446 B2
(45) Date of Patent: *Dec. 3, 2013

(54) CROSSLINKABLE MATERIALS FOR SAFETY LAMINATES

(75) Inventors: George Wyatt Prejean, Orange, TX (US); Sam Louis Samuels, Landenberg, PA (US); Alison Margaret Anne Bennett, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/194,449

(22) Filed: Jul. 29, 2011

(65) Prior Publication Data

US 2012/0028049 A1    Feb. 2, 2012

Related U.S. Application Data

(60) Provisional application No. 61/369,652, filed on Jul. 30, 2010.

(51) Int. Cl.
*H01L 31/042* (2006.01)
*H01L 31/00* (2006.01)
*C08L 33/06* (2006.01)
*C08L 37/00* (2006.01)
*C08L 23/00* (2006.01)
*B32B 27/32* (2006.01)
*B32B 37/14* (2006.01)

(52) U.S. Cl.
USPC ........... 136/251; 136/259; 525/228; 525/208; 525/240; 525/221; 524/522; 524/523; 428/141; 428/220; 428/522; 428/523; 428/215; 156/60; 156/285

(58) Field of Classification Search
USPC .......... 136/251, 259; 525/228, 208, 240, 221; 524/522, 523; 428/141, 220, 522, 523, 428/215; 156/60, 285

See application file for complete search history.

(56) References Cited

U.S. PATENT DOCUMENTS

| | | | |
|---|---|---|---|
| 5,411,845 A | 5/1995 | Robinson | |
| 5,763,062 A | 6/1998 | Smith et al. | |
| 6,518,365 B1 | 2/2003 | Powell et al. | |
| 6,797,222 B2 | 9/2004 | Hausmann et al. | |
| 2004/0161623 A1 | 8/2004 | Domine et al. | |
| 2005/0131147 A1* | 6/2005 | Brule | 525/178 |
| 2006/0084763 A1 | 4/2006 | Arhart et al. | |
| 2007/0092706 A1 | 4/2007 | Pesek et al. | |
| 2007/0218289 A1* | 9/2007 | Ando et al. | 428/411.1 |
| 2008/0220193 A1* | 9/2008 | Tohi et al. | 428/36.92 |
| 2011/0023943 A1 | 2/2011 | Prejean | |
| 2012/0024348 A1 | 2/2012 | Prejean et al. | |
| 2012/0024351 A1 | 2/2012 | Prejean et al. | |
| 2012/0024450 A1 | 2/2012 | Samuels et al. | |
| 2012/0152323 A1 | 6/2012 | Perry et al. | |

FOREIGN PATENT DOCUMENTS

| | | |
|---|---|---|
| WO | 2010/051522 A1 | 5/2010 |
| WO | 2010/051525 A1 | 5/2010 |
| WO | 2011/014777 A1 | 2/2011 |

OTHER PUBLICATIONS

PCT International Search Report and The Written Opinion for International Application No. PCT/US2011/045864, dated Nov. 30, 2011.
PCT Written Opinion of the International Preliminary Examining Authority for International Application No. PCT/US2011/045864, dated Jul. 10, 2012.

* cited by examiner

*Primary Examiner* — Michael Bernshteyn
(74) *Attorney, Agent, or Firm* — Maria M. Kourtakis; Kelly Law Registry; Linda K. H. Sauerbrunn

(57) ABSTRACT

A safety laminate comprises an interlayer that comprises a crosslinkable blend of ethylene copolymers. The first ethylene copolymer comprises copolymerized units of ethylene, optionally a first olefin having the formula $CH_2=C(R^1)CO_2R^2$, and a second olefin having the formula $CH_2=C(R^3)COOH$. The first ethylene copolymer is optionally at least partially neutralized. The second ethylene copolymer consists essentially of copolymerized units of ethylene, optionally a first olefin having the formula $CH_2=C(R^1)CO_2R^2$, and a third olefin having the formula $CH_2=C(R^4)D$. $R^1$, $R^3$ and $R^4$ represent hydrogen or an alkyl group; $R^2$ represents an alkyl group; and D represents a moiety containing an epoxy group. The crosslinkable blend is useful as an interlayer in safety laminates. Methods for preparing the safety laminates are also provided.

14 Claims, No Drawings

CROSSLINKABLE MATERIALS FOR SAFETY LAMINATES

CROSS-REFERENCE TO RELATED APPLICATION

This application claims priority under 35 U.S.C. §119 to U.S. Provisional Appln. No. 61/369,652, filed on Jul. 30, 2010, which is incorporated herein by reference in its entirety.

FIELD OF THE INVENTION

Provided herein are safety laminates that comprise a crosslinkable polymeric interlayer sheet formed of compositions of ethylene copolymers, blends of ethylene copolymers, and ethylene copolymer/ionomer blends.

BACKGROUND OF THE INVENTION

Several patents and publications are cited in this description in order to more fully describe the state of the art to which this invention pertains. The entire disclosure of each of these patents and publications is incorporated by reference herein.

Safety laminates have been in commercial production for almost a century and have been utilized in applications that require sheet material having a high degree of clarity and impact resistance. For example, safety laminates have been widely used in the automobile industry as windshields or side windows because the laminate structures are characterized by high impact and penetration resistance and because they do not scatter glass shards and debris when shattered. More recently, safety laminates have also been incorporated into building structures as windows, walls, stairs, and the like.

Simple safety laminates typically consist of a sandwich of two glass sheets or panels bonded together with an interlayer of a polymeric sheet. One or both of the glass sheets may be replaced with optically clear rigid polymeric sheets, such as sheets made of polycarbonate. Safety glass laminates have further evolved to include multiple layers of glass and polymeric sheets bonded together with interlayers of polymeric sheets.

The interlayers used in safety laminates are typically made from relatively thick polymer sheets, which exhibit toughness and bondability to the glass in the event of a crack or crash. Widely used interlayer materials include complex, multicomponent compositions based on poly(vinyl butyral), poly(urethane), and ethylene vinyl acetate copolymers.

Ionomers are copolymers produced by partially or fully neutralizing the carboxylic acid groups of precursor or parent polymers that are acid copolymers comprising copolymerized residues of α-olefins and α,β-ethylenically unsaturated carboxylic acids. The use of ionomer interlayer sheets in safety laminates is known. See, for example, U.S. Pat. Nos. 3,344,014; 3,762,988; 4,663,228; 4,668,574; 4,799,346; 5,759,698; 5,763,062; 5,895,721; 6,150,028; 6,265,054; and 6,432,522, U.S. Patent Appln. Publn. Nos. 20020155302; 20020155302; 20060182983; 20070092706; 20070122633; 20070289693; 20080044666, and PCT Patent Appln. Publn. Nos. WO9958334; WO2006057771; and WO2007149082.

Accordingly, there is a need to develop an improved polymeric composition that is useful in safety laminates so that additional transparency, improved adhesion and improved impact resistance can be realized.

SUMMARY OF THE INVENTION

Provided herein is a safety laminate that comprises (A) at least one rigid sheet layer or at least one film layer; and (B) at least one polymeric interlayer comprising an Ethylene Copolymer 1, or an Ethylene Copolymer 2, or a cross-linked or cross-linkable blend composition of Ethylene Copolymer 1 and Ethylene Copolymer 2, or a cross-linked or cross-linkable blend of Ethylene Copolymer 2 and an ionomer of Ethylene Copolymer 1.

The first ethylene copolymer (Ethylene Copolymer 1) comprises copolymerized units of ethylene, optionally a first olefin having the formula $CH_2=C(R^1)CO_2R^2$, and a second olefin having the formula $CH_2=C(R^3)COOH$. The second ethylene copolymer (Ethylene Copolymer 2) consists essentially of copolymerized units of ethylene, optionally a first olefin having the formula $CH_2=C(R^1)CO_2R^2$, and a third olefin having the formula $CH_2=C(R^4)D$. $R^1$, $R^3$ and $R^4$ represent hydrogen or an alkyl group; $R^2$ represents an alkyl group; and D represents a moiety containing an epoxy group.

Further provided herein is a blend composition useful as a cross-linkable polymeric interlayer and consisting essentially of two ethylene copolymers and optionally one or more additives. The first ethylene copolymer comprises copolymerized units of ethylene, optionally a first olefin having the formula $CH_2=C(R^1)CO_2R^2$, and a second olefin having the formula $CH_2=C(R^3)COOH$. At least a portion of the carboxylic acid groups in the second olefin is optionally neutralized to form carboxylate salts. The second ethylene copolymer consists essentially of copolymerized units of ethylene, optionally a first olefin having the formula $CH_2=C(R^1)CO_2R^2$, and a third olefin having the formula $CH_2=C(R^4)D$. $R^1$, $R^3$ and $R^4$ represent hydrogen or an alkyl group; $R^2$ represents an alkyl group; and D represents a moiety containing an epoxy group.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The term "substantially free", as used herein with respect to a composition and a component, refers to a composition that includes no more than an adventitious amount of the component. Stated alternatively, the composition includes no added amount of the component, only the amount that is commonly present in the raw materials from which the composition is produced. In some commercially available materials, the level of adventitious components is less than less than 2.5%, 1.0%, less than 0.5%, or less than 0.1% by weight, based on the weight of the commercially available material.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Unless otherwise specified under limited circumstances, all melt flow rates are measured according to ASTM method D1238 at a polymer melt temperature of 190° C. and under a weight of 2.16 kg. Moreover, the terms melt flow rate (MFR), melt flow index (MFI) and melt index (MI) are synonymous and used interchangeably herein.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an $\alpha$-olefin, an $\alpha,\beta$-ethylenically unsaturated carboxylic acid, and optionally other suitable comonomer(s), such as an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The terms "epoxy group", "ethylene oxide group" and "oxirane ring" are synonymous and used interchangeably herein to refer to a substituted or unsubstituted group having the formula —CROCR$_2$, wherein the oxygen atom is bound to both carbons and the carbons are bound to each other. When the R groups are hydrogen atoms, the ethylene oxide group is unsubstituted. The ethylene oxide group may be singly or multiply substituted. Stated alternatively, one, two or three of the R groups may be other than hydrogen atoms.

The terms "alkyl group" and "alkylene group", as used herein alone or in combined form, such as, for example, "alkoxy group", refer to saturated hydrocarbon groups that have from 1 to 8 carbon atoms and that may be branched or unbranched. An alkyl group has one bond to a carbon atom available for substitution, and an alkylene group has two bonds to one or more carbon atoms available for substitution.

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer (or sodium neutralized mixed ionomer), for example a copolymer of ethylene and methacrylic acid wherein all or a portion of the carboxylic acid groups of the copolymerized methacrylic acid units are in the form of sodium carboxylate groups.

Provided herein is a safety laminate comprising at least one rigid sheet layer or at least one film layer and at least one interlayer sheet, wherein the interlayer sheet comprises an ethylene copolymer composition. One safety laminate comprises a first ethylene copolymer (Ethylene Copolymer 1). Another safety laminate comprises a second ethylene copolymer (Ethylene Copolymer 2). Yet another safety laminate comprises a blend of Ethylene Copolymer 1 and Ethylene Copolymer 2. Yet another safety laminate comprises a blend of Ethylene Copolymer 1 and Ethylene Copolymer 2, wherein the blend is at least partially crosslinked. Yet another safety laminate comprises a blend of an ionomer of Ethylene Copolymer 1 (ionomer composition) with Ethylene Copolymer 2. Yet another safety laminate comprises a blend of an ionomer of Ethylene Copolymer 1 (ionomer composition) with Ethylene Copolymer 2, wherein the blend is at least partially crosslinked.

Ethylene Copolymers 1 and 2 and the crosslinking reaction between them are described in detail in U.S. Patent Appln. Publn. No. 2011/0023943 by George W. Prejean (hereinafter "Prejean") and in U.S. Patent Appln. Publn. No. 2012/0024348, by Prejean et al., filed on Jul. 30, 2010. Briefly, however, Ethylene Copolymer 1 is a copolymer comprising copolymerized units of ethylene, optionally of a first olefin of the formula $CH_2=C(R^1)CO_2R^2$, and of a second olefin of the formula $CH_2=C(R^3)COOH$, wherein $R^1$ is hydrogen or an alkyl group; $R^2$ is an alkyl group, or $R^2$ is an alkyl group substituted with an —OH group, such as a hydroxyethyl group, or $R^2$ is an alkyl group substituted with an alkoxy group, such as a methoxyethyl or an ethoxy ethyl group; and $R^3$ is hydrogen or an alkyl group.

Suitable first olefins having the formula $CH_2=C(R^1)CO_2R^2$ include, without limitation, methyl acrylate, methyl methacrylate, ethyl acrylate, ethyl methacrylate, butyl acrylate, and butyl methacrylate. Preferably, the first olefin having the formula $CH_2=C(R^1)CO_2R^2$ is selected from n-butyl acrylate. iso-butyl acrylate, methyl methacrylate and n-butyl methacrylate. Suitable second olefins having the formula $CH_2=C(R^3)COOH$ include, without limitation, acrylic acids and methacrylic acids. Ethylene Copolymer 1 is not an ionomer. In particular, the carboxylic acid groups of Ethylene Copolymer 1 are present in protonated form and no significant amount of these carboxylic acid groups is neutralized to form carboxylate salts.

In addition, the Ethylene Copolymer 1 may optionally further comprise other suitable additional comonomers, such as unsaturated carboxylic acids having 2 to 10, or preferably 3 to 8 carbons, or derivatives thereof. Suitable acid derivatives include acid anhydrides, amides, and esters. Esters are preferred. Specific examples of preferred esters of unsaturated carboxylic acids are described by Prejean. Examples of preferred comonomers include, but are not limited to, methyl (meth)acrylates, butyl (meth)acrylates, vinyl acetates, and combinations of two or more thereof.

Neither the first olefin nor the second olefin nor the other suitable additional comonomer, however, is a dicarboxylic acid or a diester, monoester or anhydride of a dicarboxylic acid. Dicarboxylic acids include maleic acid, fumaric acid, itaconic acid, citraconic acid, mesaconic acid, and the like. In addition, Ethylene Copolymer 1 preferably does not incorporate other comonomers in any significant amount. Stated alternatively, it is preferable that Ethylene Copolymer 1 consist essentially of copolymerized residues of ethylene and the second olefin, or that Ethylene Copolymer 1 consist essentially of copolymerized residues of ethylene, the optional first olefin and the second olefin.

Ethylene Copolymer 1 comprises up to about 40 wt %, or about 5 to about 40 wt %, or about 10 to about 35 wt %, or about 10 to about 30 wt % of copolymerized residues of the first olefin of formula $CH_2=C(R^1)CO_2R^2$, when the first olefin is present. Ethylene Copolymer 1 further comprises up to about 30 wt %, or about 2 to about 30 wt %, or about 5 to about 20 wt %, or about 5 to about 15 wt %, based on the total weight of the copolymer, of copolymerized residues of the olefin of the formula $CH_2=C(R^3)COOH$. The remainder of Ethylene Copolymer 1 comprises copolymerized residues of ethylene and up to about 5 wt % of optional additional comonomers, if any. These weight percentages are based on the total weight of Ethylene Copolymer 1.

In addition, Ethylene Copolymer 1 has a melt flow rate or melt index (MFR or MI) of about 5 g/10 min or higher, or about 30 g/10 min or higher, or about 30 to about 500 g/10 min, or about 60 g/10 min or higher, or about 60 to about 200 g/10 min, as determined in accordance with ASTM D1238 at 190° C. and under a weight of 2.16 kg.

In one particular example, Ethylene Copolymer 1 is a copolymer of ethylene/n-butyl acrylate/acrylic acid, such as those available from E. I. du Pont de Nemours and Company, Wilmington, Del. ("DuPont") under the trademark Nucrel®.

Ethylene Copolymer 1 may be an ionomer. In particular, at least a portion of the carboxylic acid groups of Ethylene Copolymer 1 may be neutralized to form carboxylate salts. Ionomers and methods of synthesizing ionomers have been described at length elsewhere, for example in U.S. Pat. No. 5,028,674, and U.S. Patent Appln. Publn. No. 2010/0112253, by Hausmann et al., filed on Nov. 2, 2009 (hereinafter "Hausmann"), and the references cited therein. To obtain the ionomers used herein, the precursor acid copolymers may be neutralized by any conventional procedure, such as those described in U.S. Pat. Nos. 3,404,134 and 6,518,365.

Preferred neutralization levels are up to about 90%, about 10% to about 90%, about 20% to about 60%, or about 15% to about 30%. Neutralization level is expressed as the weight percentage of the acid present in the ionomer that is neutralized. For example, if the ionomer contains 15 wt % of methacrylic acid and the neutralization level is 25%, then 3.75 wt % of the acid groups are neutralized, based on the total weight of the copolymer.

In addition, Ethylene Copolymer 1 when neutralized has a melt flow rate or melt index (MFR or MI) of about 1 g/10 min or higher, or about 5 to about 500 g/10 min, or about 10 to about 500 g/10 min, as determined in accordance with ASTM D1238 at 190° C. and under a weight of 2.16 kg.

Any stable cation and any combination of two or more stable cations are believed to be suitable as counterions to the carboxylate groups in the ionomer. Divalent cations, such as cations of alkaline earth metals and some transition metals, are preferred. Zinc is a preferred divalent cation. Still more preferably, Ethylene Copolymer 1 is a zinc ionomer in which about 10% to about 90%, about 20% to about 60%, or about 15% to about 30% of the hydrogen atoms of the carboxylic acid groups of the precursor acid are replaced by a charge-equivalent amount of zinc cations.

In one particular example, Ethylene Copolymer 1 is a zinc ionomer of a copolymer of ethylene/n-butyl acrylate/acrylic acid, such as those available from DuPont under the trademark Surlyn®.

Ethylene Copolymer 2 is a copolymer comprising copolymerized units of ethylene, optionally of the first olefin of the formula $CH_2=C(R^1)CO_2R^2$, and of a third olefin of the formula $CH_2$=$C(R^4)D$, wherein $R^4$ is hydrogen or an alkyl group; D is selected —$CO_2R^5$, —$CO_2R^6$-$R^5$, —$R^6$-$R^5$, —O—$R^5$, —$R^5$; and wherein $R^6$ is an alkylene group and $R^5$ is a moiety containing an epoxy group, such as a glycidyl group, a 1,2-cyclohexenyl oxide group, or a 1,2-epoxy group. Like the first and the second olefins and the optional additional comonomers, the third olefin is also not a dicarboxylic acid or a di-ester, mono-ester or anhydride of a dicarboxylic acid.

In addition, Ethylene Copolymer 2 may optionally further comprise other suitable additional comonomers, as described above with respect to Ethylene Copolymer 1. Preferably, however, Ethylene Copolymer 2 does not incorporate other comonomers in any significant amount. Stated alternatively, it is preferable that Ethylene Copolymer 2 consist essentially of copolymerized residues of ethylene and the third olefin, or that Ethylene Copolymer 2 consist essentially of copolymerized residues of ethylene, the optional first olefin and the third olefin.

Whether the first olefin is present in Ethylene Copolymer 2 is independent of whether it is also present in Ethylene Copolymer 1, and vice versa. Moreover, when the first olefin is present in both of Ethylene Copolymers 1 and 2, the olefin itself may be the same or different in each of the copolymers. For example, Ethylene Copolymer 1 may be a copolymer of ethylene/n-butyl acrylate/acrylic acid and Ethylene Copolymer 2 may be a copolymer of ethylene/n-butyl acrylate/glycidyl methacrylate. Alternatively, Ethylene Copolymer 1 may be a copolymer of ethylene/methyl acrylate/acrylic acid and Ethylene Copolymer 2 may be a copolymer of ethylene/ethyl acrylate/glycidyl methacrylate.

Ethylene Copolymer 2 comprises up to about 15 wt %, or about 3 to about 15 wt %, or about 3 to about 10 wt %, or about 4 to about 7 wt % of copolymerized residues of the third olefin of the formula $CH_2$=$C(R^4)$-D. It may optionally further comprise up to about 40 wt %, or about 5 to about 40 wt %, or about 10 to about 40 wt %, or about 20 to about 40 wt %, or about 20 to about 35 wt % of copolymerized residues of the first olefin of the formula $CH_2$=$C(R^1)CO_2R^2$. The remainder of Ethylene Copolymer 2 comprises copolymerized residues of ethylene and up to about 5 wt % of optional additional comonomers, if any. These weight percentages are based on the total weight of Ethylene Copolymer 2.

Preferably, Ethylene Copolymer 2 consists essentially of copolymerized residues of ethylene and the third olefin. Also preferably, Ethylene Copolymer 2 consists essentially of copolymerized residues of ethylene, the optional first olefin and the third olefin. In one particular example, the Ethylene Copolymer 2 is a copolymer of ethylene/n-butyl acrylate/glycidyl methacrylate, such as those available from DuPont under the trademark Elvaloy®. In another particular example, Ethylene Copolymer 2 is a copolymer of ethylene and glycidyl methacrylate.

In addition, Ethylene Copolymer 2 has a melt flow rate of about 5 to about 300 or about 5 to about 100 g/10 min, as determined in accordance with ASTM D1238 at 190° C. and under a weight of 2.16 kg.

The ratio of the Ethylene Copolymer 1 and the Ethylene Copolymer 2 in the blend composition ranges from about 90:10 to about 10:90, or about 80:20 to about 20:80, or about 70:30 to about 30:70, or about 60:40 to about 40:60, or about 45:55 to 55:45, or the ratio is about 50:50 by weight based on the total weight of Ethylene Copolymer 1 and Ethylene Copolymer 2 in the blend composition.

The mole ratio of carboxylic acid and carboxylate groups in Ethylene Copolymer 1 to epoxy groups in Ethylene Copolymer 2 is preferably about 10:1 to 1:10, about 5:1 to 1:5, about 3:1 to 1:3, or about 2 to 1.

The blend composition of Ethylene Copolymer 1 and Ethylene Copolymer 2 can be prepared by any suitable process, such as melt blending, compounding, and extrusion to pelletized blend. Preferably, no water, no other solvents such as organic solvents and aromatic solvents, and no plasticizers are added to Ethylene Copolymer 1 and Ethylene Copolymer 2 during the blending process. Stated alternatively, in a preferred process, neat Ethylene Copolymer 1 is combined with neat Ethylene Copolymer 2 in a melt process to form a neat blend composition. At no time during the preferred process do Ethylene Copolymers 1 and 2 include more than adventitious amounts of water, other solvent, or plasticizer.

During the blending and extruding processes, the temperature of the blend is preferably maintained at or below about 135° C., to prevent premature cross-linking. More preferably, the temperature of the blend is maintained at or below about 130° C., 125° C. or 120° C. At temperatures of about 120° C. or higher, the carboxylic acid group in Ethylene Copolymer 1 reacts with the epoxy group in Ethylene Copolymer 2 to form a blend composition that is cross-linked. In the case of a blend of an ionomer of Ethylene Copolymer 1 reacts with the epoxy group in Ethylene Copolymer 2, the reaction temperatures are slightly lower. Therefore, it is preferable to maintain the temperature of the blend at or below about 120° C., to prevent premature cross-linking. More preferably, the temperature of the blend is maintained at or below about 115° C., 110° C. or 100° C. At temperatures of about 100° C. or higher, the carboxylate group in ionomeric Ethylene Copolymer 1 reacts with the epoxy group in Ethylene Copolymer 2 to form a blend composition that is cross-linked. Without wishing to be bound by theory, it is believed that the cross-linking reaction between an ionomer comprising acrylic acid residues and a copolymer comprising residues of glycidyl methacrylate operates by a mechanism in which some of the carboxylic acid groups and carboxylate groups of the ionomer react to open epoxide rings, thus forming a beta-hydroxyalkyl ester linkage.

Those of skill in the art are aware that the cross-linking reaction of a non-ionomeric blend may well proceed at temperatures that are below 135° C., or below 120° C. (Corresponding temperatures for an ionomeric blend are adjusted downwards accordingly.) The kinetics of the reaction, however, are such that the blend composition may be held at 135° C. or less for a significant amount of time (up to about 15 minutes) without cross-linking to the extent that the blend composition becomes intractable for further processing.

In addition, those of skill in the art are able to determine an appropriate level of cross-linking based on the physical properties that are desired in the cross-linked encapsulant layer. For example, higher levels of cross-linking are correlated with a higher flex modulus, better high temperature adhesion, lower melt indices, and better heat resistance. The interplay of synthetic factors such as reaction time and temperature, reagent concentration, and catalyst type and level is described in detail by Prejean. In addition, one preferred catalyst is 2-ethyl imidazole. A preferred amount of 2-ethyl imidazole is 200 to 1500 ppm, based on the total amount of the ethylene copolymer blend.

The ethylene copolymer composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. When the ethylene copolymer composition is an un-ionized blend of Ethylene Copolymer 1 and Ethylene Copolymer 2, however, plasticizers are not suitable additives. These additives are described in the *Kirk Othmer Encyclopedia of Chemical Technology*, $5^{th}$ Edition, John Wiley & Sons (New Jersey, 2004), for example.

These conventional ingredients may be present in the compositions in quantities of about 0.01 to about 15 wt %, or about 0.01 to about 10 wt %, so long as they do not detract from the basic and novel characteristics of the composition and do not significantly adversely affect the performance of the composition or of the articles prepared from the composition. In this connection, the weight percentages of such additives are not included in the total weight percentages of the ionomer compositions defined herein. Typically, such additives may be present in amounts of about 0.01 to about 5 wt %, based on the total weight of the ionomer composition.

Three notable additives are thermal stabilizers, UV absorbers, and hindered amine light stabilizers. These additives are described in detail in Hausmann, cited above. A fourth notable additive is a silane coupling agent, which may be added to the ethylene copolymer composition to improve its adhesive strength. Examples of suitable silane coupling agents that are useful in the compositions described herein include, but are not limited to, γ-chloropropylmethoxysilane, vinyltrimethoxysilane, vinyltriethoxysilane, vinyltris(β-methoxyethoxy)silane, γ-vinylbenzylpropyl-trimethoxysilane, N-β-(N-vinylbenzylaminoethyl)-γ-aminopropyltrimethoxy-silane, γ-methacryloxypropyl-trimethoxysilane, vinyltriacetoxysilane, γ-glycidoxypropyl-trimethoxysilane, γ-glycidoxypropyltriethoxysilane, β-(3,4-epoxycyclohexyl)-ethyltrimethoxysilane, vinyltrichlorosilane, γ-mercapto-propylmethoxysilane, γ-aminopropyltriethoxy-silane, N-β-(aminoethyl)-γ-aminopropyltrimethoxysilane, and combinations of two or more thereof. The silane coupling agents may be incorporated in the ethylene copolymer composition at a level of about 0.01 to about 5 wt %, or about 0.05 to about 1 wt %, based on the total weight of the sodium/zinc mixed ionomer composition.

The optional incorporation of such conventional ingredients into the ethylene copolymer compositions can be carried out by any known process. This incorporation can be carried out, for example, by dry blending, by extruding a combination of the various constituents, by a masterbatch technique, or the like. See, again, the *Kirk-Othmer Encyclopedia*.

Preferably, the melt from which the sheet is formed consists essentially of Ethylene Copolymer 1, Ethylene Copolymer 2, and optional additives, if any. Also preferably, the melt is substantially free of solvents, including water and organic solvents. More preferably, the melt is substantially free of solvents and plasticizers.

When forming the melt in preparation for the extrusion process, pellets or powders of neat Ethylene Copolymers 1 and 2 may be provided. These neat powders or pellets may be combined in a "salt and pepper" blend before melting. Alternatively, Ethylene Copolymers 1 and 2 may be pre-mixed to form pellets of the blend composition. These pellets are then melted in preparation for the extrusion process. The additives may be added to the pellets or powders before, during, or after melting.

Again, during the blending and sheeting processes, the temperature of the ethylene copolymer blend should be maintained at or below about 120° C., 115° C., 110° C., 105° C. or 100° C. (even lower for ionomeric blends), to avoid premature cross-linking. In some extrusion processes, the temperature of the melt is held at or below about 120° C. and the temperature at the extrusion die is about 135° C. or higher. Exposure of the unreacted blend composition to higher temperatures for short periods of time is not expected to generate an unacceptable amount of premature cross-linking.

Returning now to the description of the polymeric interlayer, it may have a single layer or multilayer form. By "single layer", it is meant that the sheet is made of or consists essentially of the ethylene copolymer composition disclosed herein. When in a multilayer form, it is made up of two or more sub-layers and at least one of the sub-layers is made of or consists essentially of the ethylene copolymer composition, while the other sub-layer(s) may be made of any other suitable polymeric material(s), such as, for example, acid copolymers as previously defined herein, ionomers as previously defined herein, ethylene/vinyl acetate copolymers, poly (vinyl acetals) (including acoustic grade poly(vinyl acetals)), polyurethanes, polyvinylchlorides, polyethylenes (e.g., linear low density polyethylenes), polyolefin block elastomers, copolymers of α-olefins and α,β-ethylenically unsaturated carboxylic acid esters (e.g., ethylene methyl acrylate copolymers and ethylene butyl acrylate copolymers), silicone elastomers, epoxy resins, and combinations of two or more thereof. In addition, when two or more sublayers are present in the polymeric interlayer sheets, the sublayers may be formed of polymeric materials that are the same or different.

Further, the sheet comprising the ethylene copolymer composition may have a smooth or rough surface on one or both sides to facilitate deaeration during the lamination process. Rough surfaces can be created by known processes such as mechanical embossing or by melt fracture during extrusion of the sheets, or by processes described in, e.g., U.S. Pat. No. 4,035,549 and U.S. Patent Publication No. 2003/0124296.

The interlayer sheets comprising the ethylene copolymer compositions may be produced by any suitable process. For example, the sheets may be formed through dipcoating, solution casting, compression molding, injection molding, lamination, melt extrusion, blown film, extrusion coating, tandem extrusion coating, or by any other procedures that are known to those of skill in the art. In particular, the sheets may be formed by melt extrusion, melt coextrusion, melt extrusion coating, blown film process, or tandem melt extrusion coating processes.

One preferred safety laminate comprises at least one interlayer sheet comprising the ionomer composition, and the interlayer sheet is laminated to at least one rigid sheet or film layer. By "laminated", it is meant that, within a laminated structure, the two layers are adhered or bonded either directly (that is, without any additional material between the two layers) or indirectly (that is, with additional material, such as interlayer or adhesive materials, between the two layers).

Suitable rigid sheets comprise a material with a modulus of about 100,000 psi (690 MPa) or greater (as measured by ASTM Method D-638). The rigid sheets used here may be formed of glass, metal, ceramic, or of polymers including polycarbonates, acrylics, polyacrylates, cyclic polyolefins, polystyrene prepared in the presence of metallocene catalysts, and combinations of two or more thereof. Other suitable rigid sheets are described in U.S. Pat. No. 8,399,098, issued to Bennison et al., filed on Dec. 31, 2008 (hereinafter "Bennison").

The film layers used herein may be metal (such as aluminum foil) or polymeric. Suitable polymeric film materials include, but are not limited to, those described in Bennison, cited above.

When the polymeric film is located at the outside surface of the safety laminate, it may be further coated with an abrasion resistant hardcoat. Any material known for use in abrasion resistant hardcoats may be used herein. Suitable materials include, but are not limited to, those described in Bennison, cited above.

The safety laminates may further comprise other polymeric interlayer sheets formed of polymeric materials, such as poly(vinyl acetal) (e.g., poly(vinyl butyral) (PVB)), poly (vinyl chloride), polyurethane, ethylene/vinyl acetate copolymers, acid copolymers, other ionomers, or combinations of two or more thereof. In addition, when two or more polymeric sheets are incorporated in the safety laminate, the polymeric interlayer sheets may be formed of polymeric materials that are the same or different.

Each of the interlayer sheets comprising the ethylene copolymer or ionomer compositions and each of the other polymeric interlayer sheets comprised in the safety laminates may have a thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm). When the sheet comprising the ethylene copolymer composition is in a multilayer form, the inner sub-layer comprising the ethylene copolymer composition may have a thickness ranging from about 10 to about 30 mils (about 0.25 to about 0.76 mm) while the surface sub-layer comprising the ethylene copolymer composition may have a thickness of about 1 to about 5 mils (about 0.025 to about 0.12 mm).

One preferred safety laminate comprises (a) a first rigid sheet or film layer, which is laminated to (b) a sheet comprising the ethylene copolymer or ionomer composition, which is laminated to (c) a second rigid sheet or film layer. For example, the safety laminate may comprise two glass sheets with an interlayer sheet laminated between the two glass sheets, or the safety laminate may comprise a glass sheet and a hardcoated polyester film with an interlayer sheet comprising the ethylene copolymer or sodium ionomer composition laminated between the glass sheet and the hardcoated plastic film.

Another safety laminate may comprise n plies of rigid sheet or film layers (such as glass sheet layers) and n−1 plies of polymer interlayer sheets, wherein (a) each adjacent pair of the rigid sheet or film layers are interspaced by one of the polymer interlayer sheets; (b) at least one, or preferably each, of the polymer interlayer sheets is the sodium ionomer interlayer sheet disclosed above, and (c) n is an integer and $2 \leq n \leq 10$. Such safety laminates are described at length in U.S. Pat. No. 7,641,965, filed on Jun. 30, 2008, and issued to Bennison et al.

The safety laminates disclosed here may take any form known within the art. Some specific constructions include, but are not limited to, those set forth in U.S. Patent Appln. Publn. No. 2010/011235. Some examples of preferred safety laminates include, but are not limited to, rigid sheet/interlayer sheet; polymer film/interlayer sheet; rigid sheet/interlayer sheet/polymer film; rigid sheet/interlayer sheet/rigid sheet; polymeric film/interlayer sheet/polymer film; rigid sheet/interlayer sheet/polymer film/interlayer sheet/rigid sheet; and others set forth in Bennison, cited above.

If desired, one or both surfaces of any of the component layers comprised in the safety laminate may be treated prior to the lamination process to enhance the adhesion to other laminate layers. This adhesion enhancing treatment may take any form known within the art and includes flame treatments (see, e.g., U.S. Pat. Nos. 2,632,921; 2,648,097; 2,683,894; and 2,704,382), plasma treatments (see e.g., U.S. Pat. No. 4,732,814), electron beam treatments, oxidation treatments, corona discharge treatments, chemical treatments, chromic acid treatments, hot air treatments, ozone treatments, ultraviolet light treatments, sand blast treatments, solvent treatments, and combinations of two or more thereof. Also, the adhesion strength may be further improved by further applying an adhesive or primer coating on the surface of the laminate layer(s). For example, U.S. Pat. No. 4,865,711 discloses a film or sheet with improved bondability, which has a thin layer of carbon deposited on one or both surfaces. Other examples of suitable adhesives or primers include silanes, poly(allyl amine) based primers (see, e.g., U.S. Pat. Nos. 5,411,845; 5,770,312; 5,690,994; and 5,698,329), and acrylic based primers (see, e.g., U.S. Pat. No. 5,415,942). The adhesive or primer coating may take the form of a monolayer of the adhesive or primer and have a thickness of about 0.0004 to about 1 mil (about 0.00001 to about 0.03 mm), or preferably, about 0.004 to about 0.5 mil (about 0.0001 to about 0.013 mm), or more preferably, about 0.004 to about 0.1 mil (about 0.0001 to about 0.003 mm).

Any lamination process known within the art (such as an autoclave or a non-autoclave process) may be used to prepare the safety laminates. For example, the laminate may be made by an autoclave process, such as disclosed in U.S. Pat. No. 3,311,517, or a non-autoclave lamination process, such as disclosed in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 2004/0182493, European Patent No. EP 1 235 683 B1, PCT Patent Publication Nos. WO91/01880 and WO03057478. Preferably, the temperature and duration of the lamination are such that the ethylene copolymer composition becomes at least partially cross-linked. More specifically, it may be necessary to maintain the temperature of the laminate at 10 to 30° C., 10 to 40° C., 10 to 50° C., 10 to 60° C., 10 to 70° C., 10 to 80° C., 10 to 90° C., or 10 to 100° C. higher than the softening temperature of the second film layer for a period of one to 10 minutes, or one to 30 minutes, or one to 60 minutes, to achieve adhesion and cross-linking, if desired. Again, lower temperatures or shorter heating periods are believed to be sufficient when Ethylene Copolymer 1 is an ionomer rather than an ethylene acid copolymer.

The following examples are provided to describe the invention in further detail. These examples, which set forth a preferred mode presently contemplated for carrying out the invention, are intended to illustrate and not to limit the invention.

EXAMPLES

All melt indices (MI) and melt flow rates (MFR) reported herein were determined in accordance with ASTM D1238 at 190° C. and 2.16 kg, and are reported in units of g/10 min, unless otherwise specified in limited circumstances.

Examples 1 to 3 and Comparative Examples C1 to C6

Materials

ACR-1: a terpolymer containing 66.9 weight % copolymerized ethylene units, 23.5 weight % copolymerized n-butyl acrylate units and 9.6 weight % copolymerized methacrylic acid units, MFR 25 g/10 minutes at 190° C., 2.16 kg as measured in accordance with ASTM D 1238.

EBAGMA-1: a terpolymer containing 66.75 weight % copolymerized ethylene units, 28 weight % copolymerized n-butyl acrylate units and 5.25 weight % copolymerized glycidyl methacrylate units, MFR 12 g/10 minutes at 190° C., 2.16 kg as measured in accordance with ASTM D 1238.

EBAGMA-2: a terpolymer containing 64 weight % copolymerized ethylene units, 25 weight % copolymerized n-butyl acrylate units and 9 weight % copolymerized glycidyl methacrylate units, MFR 8 g/10 minutes at 190° C., 2.16 kg as measured in accordance with ASTM D 1238.

EBA-1: an ethylene/n-butyl acrylate dipolymer containing 73 weight % copolymerized ethylene units and 27 weight % copolymerized n-butyl acrylate units, MFR 4 g/10 minutes at 190° C., 2.16 kg, measured according to ASTM D 1238.

EMAME-1: an ethylene/ethyl hydrogen maleate dipolymer containing 91.5 weight % copolymerized ethylene units and 9.5 weight % copolymerized ethyl hydrogen maleate units, MFR 25 g/10 minutes at 190° C. 2.16 kg measured in accordance with ASTM D 1238.

ION-2: An ethylene/methacrylic acid copolymer containing 85 weight % copolymerized ethylene units and 15 weight % copolymerized methacrylic acid units 23% nominally neutralized to Zn salts, melt flow rate 5.5 g/10 minutes at 190° C., 2.16 kg, measured in accordance with ASTM D 1238.

APTMS: 3-aminopropyltrimethoxysilane, available from Sigma-Aldrich Co., catalog number 28, 177-8

MAOTMS: methacryloyloxypropyltrimethoxysilane, available from Sigma-Aldrich Co.

Bixcure®: A commercial EVA encapsulant sheet comprising an ethylene/vinyl acetate dipolymer blended with a proprietary modifier package including a crosslinking agent, an adhesion promoter, and various stabilizers available from Bixby International Corporation, One Preble Road, Newburyport, Mass. USA 01950. The sheet was stored in a freezer as received until it was used in the laminations.

Experimental Method and Results

Formulations were prepared from the components listed in Table 1, where the amount of each component in the composition is listed in "parts". The components of Comparative Example C3 were melt blended in an extruder and collected as pellets. Compositions that included the silane coupling agents APTMS or MAOTMS (Comparative Examples C5 and C6) were prepared by mixing polymer pellets with the liquid silane additives and permitting the pellets to imbibe the additives. The modified pellets were fed to a twin screw extruder for preparing extruded polymer sheet compositions.

Sheets of the compositions were then formed by extrusion casting or press molding. For extrusion casting, the polymer pellets were fed to a single screw or twin screw extruder, melted, conveyed, and forced through a suitably shaped (e.g., linear slot) die to produce the desired cross-sectional sheet shape. After extrusion through the die, the polymeric sheets were cast onto a water-cooled chilled roll for solidification, collected by winding on cardboard cores and stored for later laminations. Table 1 summarizes the extrusion casting conditions. In Table 1, "TS" indicates twin screw extruder and "SS" indicates single screw extruder.

For press molding of Examples 2 and 3, 6 inch×6 inch×20 mil plaques were prepared from pellets held at 185° C. under a pressure of between 2000 and 3000 tons for three minutes in a suitably shaped mold using a hydraulic press ("HP" in Table 1 below).

TABLE 1

| Component | C1 | C2 | C3 | 1 | 2 | 3 | C4 | C5 | C6 |
|---|---|---|---|---|---|---|---|---|---|
| Bixcure ® | 100 | | | | | | | | |
| ION-2 | | 100 | | | | | | | |
| EMAME-1 | | | 20 | | | | | | |
| EBA-1 | | | 80 | | | | 100 | 99.6 | 99.6 |
| ACR-1 | | | | 100 | | | | | |
| EBAGMA-1 | | | | | 100 | | | | |
| EBAGMA-2 | | | | | | 100 | | | |
| MAOTMS | | | | | | | | 0.4 | |
| APTMS | | | | | | | | | 0.4 |
| MFR (g/10 minutes) | NA | 5.5 | 10 | 25 | 12 | 8 | 4 | | |
| Melting point (° C.) | 56 | 94 | 103 | 76 | 70 | 77 | 94 | | |
| Sheet forming conditions | | | | | | | | | |
| Cast Extrusion | — | TS | SS | SS | — | — | TS | TS | TS |
| Melt temp (° C.) | — | 184 | 186 | 171 | — | — | 185 | 177 | 177 |
| Chill roll temp (° C.) | — | 20 | 7 | 24 | — | — | 15 | 30 | 30 |
| Extruder rpm | — | 150 | 55 | 56 | — | — | 100 | 80 | 80 |
| Press Molding | | | | | HP | HP | | | |
| Sheet thickness (mil) | 20 | 15 | 20 | 20 | 20 | 20 | 15 | 18 | 18 |

Example 4

Two ethylene copolymers were blended at 120° C. for 5 minutes in a Brabender mixer. The first ethylene copolymer had a melt flow rate (MFR) of 300 g/10 min and comprised copolymerized units of ethylene (65.8 wt %), n-butyl acrylate (28 wt %), and acrylic acid (6.2 wt %). The second ethylene copolymer had a MFR of 8 g/10 min and comprised copolymerized units of ethylene (66 wt %), n-butyl acrylate (25 wt %), and glycidyl methacrylate (9 wt %). The weight ratio of the first ethylene copolymer to the second ethylene copolymer was 60 to 40. The molar ratio between the acid group in the first ethylene copolymer and the glycidyl group in the second ethylene copolymer was 2.04 to 1. The MFR of the blend of the two ethylene copolymers remained at above 200 g/10 min. (All MFR reported herein were determined in accordance with ASTM D1238 at 190° C. and 2.16 kg, and are reported in units of g/10 min, unless otherwise specified in limited circumstances.)

A plaque having a thickness of 30 mil was formed by compression molding a portion of the blend at 160° C. for 15 minutes. When the measurement of the MFR of the plaque was attempted, only a hard gel formed in the melt indexer. It was therefore concluded that the polymer blend in the plaque was cross-linked. Moreover, the plaque was clear, with a total transmission value of 92%, as measured with a HunterLab Color Quest XE spectrophotometer. The plaque also had a tensile modulus of 886 psi, as measured by ASTM D1708 at ambient temperature on 19 mil thick microtensile bars using an Instru-Met (Model 1122) and a test speed of 2 in/min.

In addition, a second plaque having a thickness of 30 mil was formed by compression molding a second portion of the blend at 120° C. for 5 minutes, conditions under which no cross-linking occurs. The uncross-linked plaque without silane or any other primers was laminated between a layer of glass and a layer of Tedlar® polyvinyl fluoride film (DuPont, supplied by Krempel as Supp 2242, RONOF 050423-002) in a Meier ICO LAM 10/08 laminator under the following conditions: 5 minutes vacuum at 170° C. and 10 minutes under pressure at 170° C. (~800 mbar). The as-obtained laminate structure was conditioned under damp heat (85° C. and 85% humidity) for 1800 hours. After this conditioning, the adhesion between the plaque and the glass and the adhesion between the plaque and the Tedlar® film remained strong. In addition, peel strength was measured on 1-inch strips of the laminate with an Instron (model 1122), with a peel rate of 100 mm/min, peel angle of 180 degrees. The peel force of the plaque from the glass exceeded 20 kg/in.

Example 5

Two ethylene copolymers were blended at 120° C. for 5 minutes in a Brabender mixer. The first ethylene copolymer had a melt flow rate (MFR) of 210 g/10 min and comprised copolymerized units of ethylene (65.8 wt %), n-butyl acrylate (28 wt %), and acrylic acid (6.2 wt %). The second ethylene copolymer had a MFR of 12 g/10 min and comprised copolymerized units of ethylene (66.75 wt %), n-butyl acrylate (28 wt %), and glycidyl methacrylate (5.25 wt %). The weight ratio of the first ethylene copolymer to the second ethylene copolymer was 60 to 40. The molar ratio between the acid group in the first ethylene copolymer and the glycidyl group in the second ethylene copolymer was 3.5 to 1. The MFR of the blend of the two ethylene copolymers was 70 g/10 min.

A clear plaque having a thickness of 125 mil was formed by compression molding a portion of the blend at 175° C. for 15 minutes. When the measurement of the MFR of the clear plaque was attempted, only a hard gel formed in the melt indexer. It was therefore concluded that the polymer blend in the clear plaque was cross-linked.

Example 6

Two ethylene copolymers were blended at 120° C. for 5 minutes in a Brabender mixer. The first ethylene copolymer had a melt flow rate (MFR) of 60 g/10 min and comprised copolymerized units of ethylene (65.8 wt %), n-butyl acrylate (28 wt %), and acrylic acid (6.2 wt %). The second ethylene copolymer had a MFR of 12 g/10 min and comprised copolymerized units of ethylene (66.75 wt %), n-butyl acrylate (28 wt %), and glycidyl methacrylate (5.25 wt %). The weight ratio of the first ethylene copolymer to the second ethylene copolymer was 60 to 40. The molar ratio between the acid group in the first ethylene copolymer and the glycidyl group in the second ethylene copolymer was 3.5 to 1. The MFR of the blend of the two ethylene copolymers was 25 g/10 min.

A clear plaque having a thickness of 125 mil was formed by compression molding a portion of the blend at 175° C. for 15 minutes. When the measurement of the MFR of the clear plaque was attempted, only a hard gel formed in the melt indexer. It was therefore concluded that the polymer blend in the clear plaque was cross-linked.

Example 7

Two ethylene copolymers were blended at 120° C. for 5 minutes in a Brabender mixer. The first ethylene copolymer had a melt flow rate (MFR) of 210 g/10 min and comprised copolymerized units of ethylene (65.8 wt %), n-butyl acrylate (28 wt %), and acrylic acid (6.2 wt %). The second ethylene copolymer had a MFR of 8 g/10 min and comprised copolymerized units of ethylene (66.0 wt %), n-butyl acrylate (25 wt %), and glycidyl methacrylate (9 wt %). The weight ratio of the first ethylene copolymer to the second ethylene copolymer was 60 to 40. The molar ratio between the acid group in the first ethylene copolymer and the glycidyl group in the second ethylene copolymer was 2.04 to 1. The MFR of the blend of the two ethylene copolymers was 57 g/10 min.

A clear plaque having a thickness of 125 mil was formed by compression molding a portion of the blend at 175° C. for 15 minutes. When the measurement of the MFR of the clear plaque was attempted, only a hard gel formed in the melt indexer. It was therefore concluded that the polymer blend in the clear plaque was cross-linked.

Example 8

Three hundred grams of two ethylene copolymers and a silane were blended at 120° C. for 5 minutes in a Brabender mixer (50 rpm). The first ethylene copolymer had a melt index (MI) of 12, and comprised copolymerized units of ethylene (66.75 wt %), n-butyl acrylate (28 wt %), and glycidyl methacrylate (5.25 wt %). The second ethylene copolymer had a MI of 60 and comprised copolymerized units of ethylene (66.0 wt %), n-butyl acrylate (28 wt %), and acrylic acid (6 wt %). The blend was 59.5 wt % of the first ethylene copolymer, 40 wt % of the second ethylene copolymer, and 0.5 wt % of the silane (gamma-glycidoxypropyltrimethyoxysilane). The MI of the blend was 20 (measured at 125° C. and extrapolated to 190° C.). The melt flow (in a 10 minute period) was measured in a melt indexer with a 2160 gram weight at several different temperatures after being held at the specific temperature in the melt indexer for 10 minutes. The results are set forth in Table 2 below:

TABLE 2

| Temperature, ° C. | Melt Flow |
|---|---|
| 130 | 3.71 |
| 140 | 4.43 |
| 150 | 2.54 |
| 160 | 0.007 |
| 170 | 0.0 |

These results show that crosslinking occurs as the temperature in the melt indexer is raised, and that the blend becomes completely crosslinked at 160° C. Therefore, it is believed that a sheet made from this blend and used as a safety laminate encapsulant will be completely crosslinked when laminated for 10 minutes at 160° C.

Additionally, a plaque (20 mil thickness) of the uncrosslinked blend was prepared by compression molding at 120° C. and holding at that temperature for 2 minutes. Based on the results set forth above, no crosslinking occurs under these conditions.

A pre-press assembly was laid up by stacking, in the order given, the following layers: glass/Teflon® 500A FEP 100/TPT [Tedlar®/PET/Tedlar®]/Encapsulant/Teflon®500A FEP 100 slip sheet/glass. The encapsulant was the 20 mil plaque of the uncrosslinked blend. Each layer had the dimensions 4 inches by 6 inches, excepting the Teflon® slip sheet, whose dimensions were 1.5 inches by 4 inches. The glass was used as received from St. Gobain (Diamant solar glass). The Teflon® FEP 500A was used as received from DuPont. The TPT (Tedlar®/Poly(ethylene) terephthalate/Tedlar®) was used as received from Krempel. The Teflon® film slip sheet was placed between the perfluorinated copolymer resin film and the sample film at one end of the overlay to provide an unlaminated (unadhered) region to serve as an initiation point for subsequent peel tests.

The pre-press assembly was placed in a vacuum bag and was vacuum laminated using a VWR Programmable Oven, Model No. 1685. To begin the heating cycle, the structure was heated from ambient temperature (~25° C.) to 140° C. in 15 minutes and then held at that temperature for 5 minutes. Then it was heated to 170° C. and held for 10 minutes. The encapsulant blend was completely crosslinked under these conditions, as shown by the data in Table 2 above.

The peel strength (180 degree peel at 10 inches/min) of the encapsulant to glass was measured both before and after being exposed to damp heat (85° C., 85% relative humidity) in a damp heat chamber (Tenny Product Solutions, Model No. BTRC) for 1180 hours. Peel strength was determined to be 78 psi before exposure and 91 psi after exposure as measured on an Instru-Met adhesion tester, Model No. 1122.

The percent transmittance of the structure was measured at three different wavelengths on a Hunter Lab Color Quest XE spectrophotometer, with the following results in Table 3 below:

TABLE 3

| Wavelength, nm | % Transmittance |
|---|---|
| 400 | 90.79 |
| 550 | 91 |
| 700 | 91.56 |

Example 9

Three hundred grams of a blend of 40 wt % the first ethylene copolymer and 59.925 wt % of the second ethylene copolymer used in Example 5, above, with 0.0175 wt % of 4-dimethylaminopyridine were mixed in a Brabender mixer at 120° C. at 50 rpm for 5 minutes. The MI of the blend was 15 (measured at 125° C. and extrapolated to 190° C.). The flow of the blend was measured in a melt indexer in a 10 minute period with a 2160 gram weight at several different temperatures, after being held at the specific temperature in the melt indexer for 10 minutes. The results are set forth in Table 4 below:

TABLE 4

| Temperature, ° C. | Melt Flow |
|---|---|
| 130 | 2.85 |
| 140 | 2.12 |
| 150 | 0.38 |
| 160 | 0.0 |

A second blend of the first and the second ethylene copolymer was made. The second blend was similar to the blend described above and made under similar conditions, but did not include the 4-dimethylamino-pyridine. When the melt flow of the second blend was measured by the procedure described above, the following results were obtained, as shown in Table 5:

TABLE 5

| Temperature, ° C. | Melt Flow |
|---|---|
| 130 | 3.6 |
| 140 | 4.4 |
| 150 | 2.5 |
| 160 | 0.1 |
| 170 | 0.0 |

These results show that the rate of crosslinking can be increased with the addition of a basic catalyst. The crosslinking occurred faster at each specified temperature as evidenced by decreased flow relative to the uncatalyzed reaction. The melt flow obtained at 125° C. (MI=15.3; value calculated for 190° C.) for the catalyzed blend is compatible with extrusion and lamination processing conditions. Therefore, it is possible to use a catalyst to increase the rate of the reaction when forming an encapsulant sheet from this blend, without causing premature crosslinking.

Example 10

Three hundred grams of a blend of a first ethylene copolymer (89 wt % ethylene, 11 wt % methacrylic acid, MI=100 g/10 min) and the second ethylene copolymer described in Example 5, above, were mixed in a Brabender mixer at 120° C. at 50 rpm for 5 minutes. The blend composition was 60 wt % of the first ethylene copolymer and 40 wt % of the second ethylene copolymer. The melt index (MI) of the blend was 45 (measured at 125° C. and extrapolated to 190° C.). The flow of the blend (in a 10 minute period) in a melt indexer equipped with a 2160 gram weight was determined at several different temperatures after being held at the specific temperature in the melt indexer for 10 minutes. The results, shown in Table 6, were:

TABLE 6

| Temperature, ° C. | Melt Flow |
|---|---|
| 130 | 4.77 |
| 140 | 7.39 |
| 150 | 9.65 |
| 160 | 9.60 |
| 170 | 0.0 |

Example 11

Several 300-gram blends of a sodium ionomer (ethylene/methacrylic acid dipolymer, 11 weight % MAA, 37% neutralized, $Na^+$ cation, MI of ionomer 10 g/10 min) and an ethylene copolymer (66.75 wt % ethylene/28 wt % n-butyl acrylate/5.25 wt % glycidyl methacrylate, MI of 12 g/10 min) were prepared in a Brabender mixer at 120° C. at 50 rpm for 5 minutes. There was a significant initial MI reduction of the blends (125° C. MI test), especially at the higher sodium ionomer levels, showing that reaction between the two blend components did occur. Table 7, below, shows the comparison of the measured MI to the predicted MI. The predictions were made according to the blend rule, which assumes no reaction between the blend components.

TABLE 7

| Blend* | MI Measured | MI Predicted |
|---|---|---|
| 10/90 | 12 | 10.75 |
| 20/80 | 9 | 11.8 |
| 30/70 | 7.17 | 11.6 |
| 40/60 | 2.436 | 11.36 |
| 50/50 | 0.812 | 11.15 |
| 60/40 | 0 | 10.95 |

*wt % sodium ionomer/wt % ethylene copolymer

The melt flow of each blend (in a 10 minute period) was measured in a melt indexer with a 2160 gram weight at several different temperatures after being held at the specific temperature in the melt indexer for 10 minutes. As shown in Table 8 below, the blends retained some flow when heated for 10 minutes at temperatures up to 170° C. If the blend were fully crosslinked, the predicted melt flow would be zero.

TABLE 8

| Temp | 10% Na ionomer | 20% Na ionomer | 30% Na ionomer | 40% Na ionomer | 50% Na ionomer | 60% Na ionomer |
|---|---|---|---|---|---|---|
| 130° C. | 1.68 | 1.33 | 1.12 | 0.38 | 0.4 | n/a* |
| 140° C. | 2.3 | 1.83 | 1.58 | 0.52 | 0.31 | 0.16 |
| 150° C. | 3.34 | 2.24 | 1.5 | 0.6 | 0.37 | n/a |
| 160° C. | 4.32 | 2.91 | 2.04 | 0.7 | 0.3 | 0.17 |
| 170° C. | 4.65 | 2.45 | 2.01 | 0.55 | 0.1 | 0.11 |

* "n/a" means "not available".

Example 12

Three hundred grams of a blend of zinc ionomer (85 wt % ethylene/15 wt % methacrylic acid with 22% of the methacrylic groups neutralized, $Zn^{2+}$ cation, MI=14) and ethylene copolymer (66.75 wt % ethylene/28 wt % n-butyl acrylate/5.25 wt % glycidyl methacrylate, MI=12) were prepared in a Brabender mixer at 120° C. at 50 rpm for 5 minutes. The blend composition was 20 wt % zinc ionomer and 80 wt % ethylene copolymer. The melt index (MI) of the blend was 4, when measured at 125° C. and extrapolated to 190° C. Flow in a 10 minute period in a melt indexer with a 2160 gram weight was determined at several different temperatures after being held at the specific temperature in the melt indexer for 10 minutes. The results are shown in Table 9, below.

TABLE 9

| Temp, ° C. | Melt Flow |
|---|---|
| 130 | 0.6 |
| 140 | 0.66 |
| 150 | 0.35 |
| 160 | 0.09 |
| 170 | 0.0 |

These results show that crosslinking occurred as the temperature was raised, and the blend became completely crosslinked at 170° C. Therefore, it is believed that a sheet made from this blend and used as a safety laminate encapsulant will be completely crosslinked when laminated for 10 minutes at 170° C.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A safety laminate comprising at least one interlayer sheet that is laminated to one or more rigid sheets, one or more other polymeric interlayer sheets, or one or more film layers; wherein the at least one interlayer sheet comprises an ethylene copolymer composition; and wherein the ethylene copolymer composition comprises a blend of Ethylene Copolymer 1 and Ethylene Copolymer 2;

wherein said Ethylene Copolymer 1 consists essentially of copolymerized units of ethylene, optionally up to about 40 wt % of copolymerized units of a first olefin having a formula of $CH_2$=$C(R^1)CO_2R^2$, and up to about 30 wt % of copolymerized units of a second olefin having a formula of $CH_2$=$C(R^3)COOH$, wherein the weight percentages of the copolymerized units of the first olefin and of the second olefin are based on the total weight of said Ethylene Copolymer 1; wherein optionally at least a portion of the carboxylic acid groups of the second olefin are neutralized to form carboxylate salts; wherein $R^1$ represents hydrogen or an alkyl group, $R^2$ represents an alkyl group, and $R^3$ represents hydrogen or an alkyl group; and wherein said Ethylene Copolymer 2 consists essentially of copolymerized units of ethylene, optionally up to about 40 wt % of copolymerized units of the first olefin, and up to about 15 wt % of copolymerized units of a third olefin having a formula of $CH_2$=$C(R^4)$-D, wherein the weight percentages of the copolymerized units of the first olefin and of the third olefin are based on the total weight of said Ethylene Copolymer 2; wherein $R^4$ represents hydrogen or an alkyl group; wherein -D represents a moiety selected from the group consisting of —$CO_2R^5$, —$CO_2R^6$-$R^5$, —$R^6$-$R^5$, —O—$R^5$, and —$R^5$; wherein $R^5$ represents a moiety containing an epoxy group and $R^6$ represents an alkylene group;

wherein the blend composition being held at 120° C. for up to about 15 minutes is not cross-link to the extent that the blend composition becomes intractable for further processing; and with the proviso that, in the blend of Ethylene Copolymer 1 and Ethylene Copolymer 2, none of said first, second or third olefins is a dicarboxylic acid or a di-ester, monoester or anhydride of the dicarboxylic acid.

2. The safety laminate of claim 1, wherein the blend of Ethylene Copolymer 1 and Ethylene Copolymer 2 is at least partially cross-linked.

3. The safety laminate of claim 2, wherein the blend comprises an ionomer of Ethylene Copolymer 1.

4. The safety laminate of claim 3, wherein the ionomer of Ethylene Copolymer 1 comprises cations that consist essentially of sodium cations.

5. The safety laminate of claim 3, wherein the ionomer of Ethylene Copolymer 1 comprises cations that consist essentially of zinc cations.

6. The safety laminate of claim 1, wherein the ethylene copolymer composition comprises about 10 to about 90 wt % of Ethylene Copolymer 1 and about 90 to about 10 wt % of Ethylene Copolymer 2, based on the total weight of the ethylene copolymer composition.

7. The safety laminate of claim 1, wherein the rigid sheet comprises a material having a modulus of about 690 MPa or greater, as determined in accordance with ASTM D638, and wherein the material is selected from the group consisting of glass, metal, ceramic, and polymers.

8. The safety laminate of claim 1, wherein the film layer is a metal film or a polymeric film comprising one or more materials selected from the group consisting of polyesters, polycarbonates, polyolefins, norbornene polymers, polystyrenes, styrene-acrylate copolymers, acrylonitrile-styrene copolymers, polysulfones, polyamides, polyurethanes, acrylic polymers, cellulose acetates, cellophanes, vinyl chloride polymers and fluoropolymers.

9. The safety laminate of claim 1, further comprising one or more other polymeric interlayer sheets, wherein the one or more other polymeric interlayer sheets comprise one or more materials selected from the group consisting of poly(vinyl acetals), poly(vinyl chlorides), polyurethanes, ethylene/vinyl acetate copolymers, acid copolymers, and ionomers.

10. The safety laminate of claim 1, wherein the at least one interlayer sheet comprising the ethylene copolymer composition is laminated between two glass sheets.

11. The safety laminate of claim 1, wherein the at least one interlayer sheet comprising the ethylene copolymer composition is laminated between a glass sheet and a polyester film that is coated with an abrasion resistant hardcoat on the surface that is facing away from the interlayer sheet.

12. The safety laminate of claim 1, which comprises n rigid sheet or film layers and (n−1) polymeric interlayer sheets, wherein (a) each of the adjacent pairs of the rigid sheet or film layers is interspaced by one of the polymeric interlayer sheets; (b) at least one of the (n−1) polymeric interlayer sheets comprises the ethylene copolymer composition, and (c) n is an integer and 2<n<10.

13. The safety laminate of claim 12, which comprises an impact zone that faces to the impact force and an anti-spall zone that is firmly adhered to the impact zone and faces away from the impact force, wherein (A) the impact zone is formed by the n rigid sheets and the (n−1) polymeric interlayer sheets; and (B) the anti-spall zone is formed of an additional polymer sheet and an additional film layer with a first surface of the additional polymer sheet adhered firmly to the impact zone and a second surface of the polymer sheet adhered firmly to the additional polymer film.

14. The safety laminate of claim 13, wherein (A) each of the n rigid sheets are glass sheets; (B) each of the (n−1) polymeric interlayer sheets comprises the ethylene copolymer composition; (C) the additional polymeric interlayer sheet comprises a poly(vinyl butyral); and (D) the additional polymer film is a poly(ethylene terephthalate) film having a surface that is opposite from the impact zone and a hardcoat adhered to the surface.

\* \* \* \* \*